(12) United States Patent  (10) Patent No.: US 8,856,593 B2
Eckhardt et al.  (45) Date of Patent: Oct. 7, 2014

(54) FAILURE RECOVERY USING CONSENSUS REPLICATION IN A DISTRIBUTED FLASH MEMORY SYSTEM

(75) Inventors: Andrew D. Eckhardt, Menlo Park, CA (US); Michael J. Koster, Bridgeville, CA (US)

(73) Assignee: Sandisk Enterprise IP LLC, Milpitas, CA (US)

( * ) Notice: Subject to any disclaimer, the term of this patent is extended or adjusted under 35 U.S.C. 154(b) by 672 days.

(21) Appl. No.: 13/085,441

(22) Filed: Apr. 12, 2011

(65) Prior Publication Data

US 2012/0011398 A1  Jan. 12, 2012

Related U.S. Application Data

(60) Provisional application No. 61/323,306, filed on Apr. 12, 2011.

(51) Int. Cl.
*G06F 11/00* (2006.01)
*G06F 11/20* (2006.01)

(52) U.S. Cl.
CPC ........ *G06F 11/2028* (2013.01); *G06F 11/2097* (2013.01); *G06F 11/2048* (2013.01); *G06F 11/2035* (2013.01)
USPC .............. 714/20; 710/269; 711/108; 709/217

(58) Field of Classification Search
USPC .............. 714/20; 710/269; 711/708; 709/217
See application file for complete search history.

(56) References Cited

U.S. PATENT DOCUMENTS

| | | |
|---|---|---|
| 4,916,605 A | 4/1990 | Beardsley et al. |
| 5,046,002 A | 9/1991 | Takashi et al. |
| 5,057,996 A | 10/1991 | Cutler et al. |
| 5,117,350 A | 5/1992 | Parrish et al. |
| 5,212,789 A | 5/1993 | Rago |
| 5,287,496 A | 2/1994 | Chen et al. |
| 5,297,258 A | 3/1994 | Hale et al. |
| 5,394,555 A | 2/1995 | Hunter et al. |
| 5,403,639 A | 4/1995 | Belsan et al. |
| 5,423,037 A | 6/1995 | Hvasshovd |
| 5,509,134 A | 4/1996 | Fandrich et al. |
| 5,537,534 A | 7/1996 | Voigt et al. |
| 5,603,001 A | 2/1997 | Sukegawa et al. |

(Continued)

FOREIGN PATENT DOCUMENTS

| | | |
|---|---|---|
| EP | 1548600 B1 | 1/2007 |
| EP | 1746510 A1 | 1/2007 |

OTHER PUBLICATIONS

Pease, "Reaching Agreement in the Presence of Faults" 1980, ACM, p. 228-234.*
Lamport, "Paxos Made Simple", Nov. 2001, pp. 1-14.*

(Continued)

*Primary Examiner* — Joshua P Lottich
*Assistant Examiner* — Jeison C Arcos
(74) *Attorney, Agent, or Firm* — Morgan, Lewis & Bockius LLP (57) ABSTRACT

Data replication in a distributed node system including one or more nodes. A consensus protocol for failure recovery is implemented. Data items and information relating to consensus protocol roles of participant nodes are stored in at least some of the plurality of nodes. Logical logs stored in at least some of the plurality of nodes are created. The logical logs contain additional consensus protocol information including container metadata and replicated data.

35 Claims, 6 Drawing Sheets

(56) References Cited

U.S. PATENT DOCUMENTS

| | | |
|---|---|---|
| 5,611,057 A | 3/1997 | Pecone et al. |
| 5,613,071 A | 3/1997 | Rankin et al. |
| 5,680,579 A | 10/1997 | Young et al. |
| 5,692,149 A | 11/1997 | Lee |
| 5,701,480 A | 12/1997 | Raz |
| 5,742,787 A | 4/1998 | Talreja |
| 5,887,138 A | 3/1999 | Hagersten et al. |
| 5,897,661 A | 4/1999 | Baranovsky et al. |
| 5,897,664 A | 4/1999 | Nesheim et al. |
| 5,963,983 A | 10/1999 | Sakakura et al. |
| 6,000,006 A | 12/1999 | Bruce et al. |
| 6,023,745 A | 2/2000 | Lu |
| 6,052,815 A | 4/2000 | Zook |
| 6,130,759 A | 10/2000 | Blair |
| 6,141,692 A | 10/2000 | Loewenstein et al. |
| 6,216,126 B1 | 4/2001 | Ronstrom |
| 6,298,390 B1 | 10/2001 | Matena et al. |
| 6,308,169 B1 | 10/2001 | Ronstrom et al. |
| 6,434,144 B1 | 8/2002 | Romanov |
| 6,467,060 B1 | 10/2002 | Malakapalli et al. |
| 6,615,313 B2 | 9/2003 | Kato et al. |
| 6,658,526 B2 | 12/2003 | Nguyen et al. |
| 6,728,826 B2 | 4/2004 | Kaki et al. |
| 6,745,209 B2 | 6/2004 | Holenstein et al. |
| 6,804,766 B1 | 10/2004 | Noel et al. |
| 6,874,044 B1 | 3/2005 | Chou et al. |
| 6,938,084 B2 | 8/2005 | Gamache et al. |
| 6,944,699 B1 * | 9/2005 | Bugnion et al. ............... 710/269 |
| 6,981,070 B1 | 12/2005 | Luk et al. |
| 7,003,586 B1 | 2/2006 | Bailey et al. |
| 7,010,521 B2 | 3/2006 | Hinshaw et al. |
| 7,043,621 B2 | 5/2006 | Merchant et al. |
| 7,082,481 B2 | 7/2006 | Lambrache et al. |
| 7,162,467 B2 | 1/2007 | Eshleman et al. |
| 7,200,718 B2 | 4/2007 | Duzett |
| 7,203,890 B1 | 4/2007 | Normoyle |
| 7,249,280 B2 | 7/2007 | Lamport et al. |
| 7,251,749 B1 | 7/2007 | Fong et al. |
| 7,269,708 B2 | 9/2007 | Ware |
| 7,269,755 B2 | 9/2007 | Moshayedi et al. |
| 7,272,605 B1 | 9/2007 | Hinshaw et al. |
| 7,272,654 B1 | 9/2007 | Brendel |
| 7,281,160 B2 | 10/2007 | Stewart |
| 7,305,386 B2 | 12/2007 | Hinshaw et al. |
| 7,334,154 B2 | 2/2008 | Lorch et al. |
| 7,359,927 B1 | 4/2008 | Cardente |
| 7,383,290 B2 | 6/2008 | Mehra et al. |
| 7,406,487 B1 | 7/2008 | Gupta et al. |
| 7,415,488 B1 | 8/2008 | Muth et al. |
| 7,417,992 B2 | 8/2008 | Krishnan |
| 7,467,265 B1 | 12/2008 | Tawri et al. |
| 7,529,882 B2 | 5/2009 | Wong |
| 7,542,968 B2 | 6/2009 | Yokomizo et al. |
| 7,562,162 B2 | 7/2009 | Kreiner et al. |
| 7,584,222 B1 | 9/2009 | Georgiev |
| 7,610,445 B1 | 10/2009 | Manus et al. |
| 7,647,449 B1 | 1/2010 | Roy et al. |
| 7,657,710 B2 | 2/2010 | Loewenstein |
| 7,809,691 B1 | 10/2010 | Karmarkar et al. |
| 7,822,711 B1 | 10/2010 | Ranade |
| 7,885,923 B1 | 2/2011 | Tawri et al. |
| 7,917,472 B2 | 3/2011 | Persson |
| 8,015,352 B2 | 9/2011 | Zhang et al. |
| 8,018,729 B2 | 9/2011 | Skinner |
| 8,024,515 B2 | 9/2011 | Auerbach et al. |
| 8,037,349 B2 | 10/2011 | Mandagere et al. |
| 8,069,328 B2 | 11/2011 | Pyeon |
| 8,099,391 B1 | 1/2012 | Monckton |
| 8,225,053 B1 | 7/2012 | McCorkendale et al. |
| 8,239,617 B1 | 8/2012 | Linnell |
| 8,261,289 B2 | 9/2012 | Kasravi et al. |
| 8,321,450 B2 | 11/2012 | Thatte et al. |
| 8,335,776 B2 | 12/2012 | Gokhale |
| 8,370,853 B2 | 2/2013 | Giampaolo et al. |
| 8,401,994 B2 | 3/2013 | Hoang et al. |
| 2002/0129192 A1 | 9/2002 | Spiegel et al. |
| 2002/0166031 A1 | 11/2002 | Chen et al. |
| 2002/0184239 A1 | 12/2002 | Mosher, Jr. et al. |
| 2003/0016596 A1 | 1/2003 | Chiquoine et al. |
| 2003/0097610 A1 | 5/2003 | Hofner |
| 2003/0177408 A1 | 9/2003 | Fields et al. |
| 2003/0220985 A1 | 11/2003 | Kawamoto et al. |
| 2004/0010502 A1 | 1/2004 | Bomfim et al. |
| 2004/0078379 A1 | 4/2004 | Hinshaw et al. |
| 2004/0143562 A1 | 7/2004 | Chen et al. |
| 2004/0148283 A1 | 7/2004 | Harris et al. |
| 2004/0172494 A1 | 9/2004 | Pettey et al. |
| 2004/0205151 A1 | 10/2004 | Sprigg et al. |
| 2004/0230862 A1 | 11/2004 | Merchant et al. |
| 2004/0267835 A1 | 12/2004 | Zwilling et al. |
| 2005/0005074 A1 | 1/2005 | Landin et al. |
| 2005/0021565 A1 | 1/2005 | Kapoor et al. |
| 2005/0027701 A1 | 2/2005 | Zane et al. |
| 2005/0028134 A1 | 2/2005 | Zane et al. |
| 2005/0034048 A1 | 2/2005 | Nemawarkar et al. |
| 2005/0081091 A1 | 4/2005 | Bartfai et al. |
| 2005/0086413 A1 | 4/2005 | Lee et al. |
| 2005/0120133 A1 | 6/2005 | Slack-Smith |
| 2005/0131964 A1 | 6/2005 | Saxena |
| 2005/0240635 A1 | 10/2005 | Kapoor et al. |
| 2005/0246487 A1 | 11/2005 | Ergan et al. |
| 2006/0059428 A1 | 3/2006 | Humphries et al. |
| 2006/0085594 A1 | 4/2006 | Roberson et al. |
| 2006/0130063 A1 | 6/2006 | Kilian et al. |
| 2006/0161530 A1 | 7/2006 | Biswal et al. |
| 2006/0174063 A1 | 8/2006 | Soules et al. |
| 2006/0174069 A1 | 8/2006 | Shaw et al. |
| 2006/0179083 A1 | 8/2006 | Kulkarni et al. |
| 2006/0195648 A1 | 8/2006 | Chandrasekaran et al. |
| 2006/0212795 A1 | 9/2006 | Cottrille et al. |
| 2006/0218210 A1 | 9/2006 | Sarma et al. |
| 2006/0242163 A1 | 10/2006 | Miller et al. |
| 2006/0253724 A1 | 11/2006 | Zhang |
| 2007/0043790 A1 | 2/2007 | Kryger |
| 2007/0073896 A1 | 3/2007 | Rothman et al. |
| 2007/0143368 A1 | 6/2007 | Lundsgaard et al. |
| 2007/0156842 A1 * | 7/2007 | Vermeulen et al. ........... 709/217 |
| 2007/0174541 A1 | 7/2007 | Chandrasekaran et al. |
| 2007/0234182 A1 | 10/2007 | Wickeraad et al. |
| 2007/0276784 A1 | 11/2007 | Piedmonte |
| 2007/0283079 A1 | 12/2007 | Iwamura et al. |
| 2007/0288692 A1 | 12/2007 | Bruce et al. |
| 2007/0288792 A1 | 12/2007 | Thorpe et al. |
| 2007/0294564 A1 | 12/2007 | Reddin et al. |
| 2007/0299816 A1 | 12/2007 | Arora et al. |
| 2008/0016300 A1 | 1/2008 | Yim et al. |
| 2008/0034076 A1 | 2/2008 | Ishikawa et al. |
| 2008/0034174 A1 | 2/2008 | Traister et al. |
| 2008/0034249 A1 | 2/2008 | Husain et al. |
| 2008/0046538 A1 | 2/2008 | Susarla et al. |
| 2008/0046638 A1 | 2/2008 | Maheshwari et al. |
| 2008/0126706 A1 | 5/2008 | Newport et al. |
| 2008/0288713 A1 | 11/2008 | Lee et al. |
| 2008/0301256 A1 | 12/2008 | McWilliams |
| 2009/0006500 A1 | 1/2009 | Shiozawa et al. |
| 2009/0006681 A1 | 1/2009 | Hubert et al. |
| 2009/0006888 A1 | 1/2009 | Bernhard et al. |
| 2009/0019456 A1 | 1/2009 | Saxena et al. |
| 2009/0024871 A1 | 1/2009 | Emaru et al. |
| 2009/0030943 A1 | 1/2009 | Kall |
| 2009/0059539 A1 | 3/2009 | Ryu et al. |
| 2009/0070530 A1 | 3/2009 | Satoyama et al. |
| 2009/0150599 A1 | 6/2009 | Bennett |
| 2009/0177666 A1 | 7/2009 | Kaneda |
| 2009/0198791 A1 | 8/2009 | Menghnani |
| 2009/0240664 A1 | 9/2009 | Dinker et al. |
| 2009/0240869 A1 | 9/2009 | O'Krafka et al. |
| 2009/0327751 A1 | 12/2009 | Koifman et al. |
| 2010/0058021 A1 | 3/2010 | Kawamura |
| 2010/0125695 A1 | 5/2010 | Wu et al. |
| 2010/0241895 A1 | 9/2010 | Li et al. |
| 2010/0262762 A1 | 10/2010 | Borchers et al. |
| 2010/0299490 A1 | 11/2010 | Attarde et al. |
| 2010/0318821 A1 | 12/2010 | Kwan et al. |

(56) References Cited

U.S. PATENT DOCUMENTS

| | | | |
|---|---|---|---|
| 2010/0325498 | A1 | 12/2010 | Nagadomi |
| 2011/0022566 | A1 | 1/2011 | Beaverson et al. |
| 2011/0072206 | A1* | 3/2011 | Ross et al. .................... 711/108 |
| 2011/0082985 | A1 | 4/2011 | Haines et al. |
| 2011/0099420 | A1 | 4/2011 | MacDonald McAlister |
| 2011/0167038 | A1 | 7/2011 | Wang et al. |
| 2011/0179279 | A1 | 7/2011 | Greevenbosch et al. |
| 2011/0185147 | A1 | 7/2011 | Hatfield et al. |
| 2011/0191299 | A1 | 8/2011 | Huynh Huu et al. |
| 2011/0225214 | A1 | 9/2011 | Guo |

OTHER PUBLICATIONS

Lamport, "Fast Paxos", Jul. 2005, Microsoft, pp. 1-43.*
Lamport, "Generalized Consensus and Paxos", Mar. 2004, Microsoft, pp. 1-25.*
Schneider, "Implementing fault tolerant services using the state machine",1990, Cornell University, pp. 1-21.*
Malkhi, "Lecture notes in computer science [Section: Omega Meets Paxos, Leader election and stabiilty without eventual timely links]", 2005, pp. 199-213.*
Lamport, "Cheap Paxos", 2004, Microsoft, pp. 1-9.*
Guerraoui, "A Leader Election Protocol for Eventually Synchronous Shared Memory Systems", 2006, IEEE, pp. 1-6.*
Chockler, Active Disk Paxos with infinitely many processes:, Apr. 2005, Springer-Verlag, pp. 1-12.*
Dwork, "Concensus in the presence of partial synchrony", 1988, MIT, p. 1-6.*
Ajmani, Automatic Software Upgrades for Distributed Systems, MIT, Sep. 2004, 164 pgs.
Amza, Data Replication Strategies for Fault Tolerance and Availability on Commodity Clusters, 2000, 9 pgs.
Bsn-modulestore, Versioning Concept, Oct. 13, 2010, 2 pgs.
Btrfs, http://en.wikipedia.org, Oct. 3, 2011, 9 pgs.
Buchholz, The Structure of the Reiser File System, Jan. 26, 2006, 21 pgs.
Chacon, Git, The Fast Version Control System, Oct. 3, 2011, 3 pgs.
Email Communication from James Bodwin to Christopher Brokaw re prior art, Sep. 13, 2011, 4 pgs.
Git (Software), http://en.wikipedia.org, Oct. 3, 2011, 10 pgs.
Hitz, File System Design for an NFS File Server Appliance, Jan. 19, 1994, 23 pgs.
McDonald, Architectural Semantics for Practical Transactional Memory, Jun. 2006, 12 pgs.
McGonigle, A Short History of btrfs, Aug. 14, 2009, 11 pgs.
Mellor, ZFS—the future of file systems? Aug. 14, 2006, 5 pgs.
Mercurial, http://en.wikipedia.org, Oct. 2, 2011, 6 pages.
Module: Mongoid: Versioning, http://rdoc.info, Documentation by YARD 0.7.2, 6 pages Oct. 3, 2011.
Noach, Database Schema under Version Control, code.openarck.org, Apr. 22, 2010, 6 pages.
Reiser FS, , http://enwikipedia.org, Sep. 17, 2011, 5 pgs.
RICE, Extension Versioning, Update and Compatibility, Aug. 9, 2011, 11 pgs.
RICE, Toolkit Version Format, Aug. 19, 2011, 4 pgs.
Russell, Track and Record Database Schema Versions, Jun. 28, 2005, 8 pgs.
Schooner Information Technology, IPAF, PCT/US2008/065167, Oct. 23, 2008, 7 pgs.
Schooner Information Technology, ISR/WO, PCT/US2008/065167, Jan. 28, 2009, 16 pgs.
SQL Server Database Schema Versioning and Update, Dec. 2, 2009, 2 pgs.
Sufficiently Advanced Bug, File Versioning, Caching and Hashing, Oct. 3, 2011, 3 pgs.
The Z File System (ZFS), FreeBSD Handbook, Oct. 3, 2011, 8 pgs (Author not provided).
Tux3 Linux Filesystem Project, 2008, 1 pg.
Tux3 Versioning Filesystem, Jul. 2008, 67 pgs.
Tux3, http://en.wikipedia.org, Jun. 2, 2010, 3 pgs.
Vijaykumar, Speculative Versioning Cache, Dec. 1, 2001, 13 pgs.
WAFL—Write Anywhere File Layout, 1999, 1 pg.
Write Anywhere File Layout, Sep. 9, 2011, 2 pgs.
ZFS, , http://en.wikipedia.org Sep. 30, 2011, 18 pgs.
Mukherjee et al., Verification of an Industrial CC-NUMA server, Proceedings of ASP-DAC 2002, 7th Asia and South Pacifric and the 15th International Conference on VLSI Design, Jan. 7-11, 2002, 6 pages.
Shacham et al., Verification of chip multiprocessor memory system using a relaxed scoreboard, Microarchitecture, 2008, MICRO-41, 2008, 41st IEEE/ACM International Symposium, Nov. 8-12, 2008, 12 pages.
Walker, Hash Table Tutorial, Oct. 13, 2007, 14 pgs.

* cited by examiner

|  | N0 | N1 | N2 |
|---|---|---|---|
| Propose_n | 3 | 4 | 5 |
| Promised_n |  |  |  |
| Accepted_n |  |  |  |
| Accepted Value |  |  |  |

FIG.5A

|  | N0 | N1 | N2 |
|---|---|---|---|
| Propose_n | 3 | 4 | 5 |
| Promised_n | 3 | 3 |  |
| Accepted_n |  |  |  |
| Accepted Value |  |  |  |

FIG.5B

|  | N0 | N1 | N2 |
|---|---|---|---|
| Propose_n | 3 | 4 | 5 |
| Promised_n | 3 | 3 |  |
| Accepted_n | 3 | 3 |  |
| Accepted Value | A | A |  |

FIG.5C

|  | N0 | N1 | N2 |
|---|---|---|---|
| Propose_n | 3 | 4 | 5 |
| Promised_n | 3 | 5 |  |
| Accepted_n | 3 | 3 |  |
| Accepted Value | A | A |  |

FIG.5D

|  | N0 | N1 | N2 |
|---|---|---|---|
| Propose_n | 3 | 4 | 5 |
| Promised_n | 3 | 5 | 5 |
| Accepted_n | 3 | 5 | 5 |
| Accepted Value | A | A | A |

FAILURE RECOVERY USING CONSENSUS REPLICATION IN A DISTRIBUTED FLASH MEMORY SYSTEM

CROSS-REFERENCE TO RELATED APPLICATION

This application claims the benefit under 35 USC 119(e) of the co-pending and commonly owned U.S. Provisional Application No. 61/323,306 entitled "Failure Recovery Using Consensus Replication In A Shared Distributed Flash Memory System" filed on Apr. 12, 2010, which is incorporated herein by reference.

RELATED APPLICATION DATA

The present application is related to co-pending U.S. patent application Ser. No. 12/276,540, entitled "Scalable Database Management Software on a Cluster of Nodes Using a Shared-Distributed Flash Memory, filed on Nov. 24, 2008, the disclosure of which is hereby incorporated by reference for all purposes as if fully set forth herein.

FIELD OF THE INVENTION

The disclosure herein relates to providing failure recovery using consensus replication in a distributed node system.

BACKGROUND

In distributed computer systems including multiple computer nodes, data may be replicated across computer nodes and storage units to decrease the chance of data loss and or to increase the percentage of time that the systems are available as compared to non-replicated systems. When replicating, many applications desire single copy consistency semantics where all clients see the same version of data and data writes, which may have been observed, do not revert to a prior state. For example, consider a single register with replicas A and B with an initial value 1. A client changes the register value to 2. Once the value 2 is observed, no reader is allowed to observe the value 1 regardless of which replica is read, even if the observation occurs indirectly, such as by knowing that the write completed. A split brain scenario where some clients read the value 1 and others read the value 2 is avoided.

This is sometimes solved by designating one replica as the "master" and additional replicas as "slaves," with a more reliable hardware and software component storing the replica which is the current master and slaves which may become masters. When a slave fails, the current master uses the component (i.e., the more reliable hardware and software component) to designate the failed slave non-authoritative before completing additional data writes. However, when the master fails, an authoritative slave is made master and the old master is marked as non-authoritative by the component before input-output (IO) requests are satisfied. This scheme may be undesirable because some embodiments of the component can still be single points of failure. The scheme may also be intolerant of sequential failures which are common due to correlated causes causing simultaneous failures to manifest sequentially. For example, consider three replicas A, B, and C with A acting as master. Correlated failures such as overheating may cause abnormal shutdowns of all three nodes far enough apart in time for B to replace A and then C to replace B before C fails. When the fault causes a permanent failure to C all data is lost because neither A nor B is authoritative.

Consensus protocols such as Paxos can be applied to solve the problem, exploiting the mathematical property of every majority (>n/2 in an n-replica system) sharing at least one member in common with every other majority. The system remains available through any sequence of failures leaving a majority reachable and reliable as long as a complete data set exists regardless of what sequential failures occurred. When replication is implemented with a consensus protocol, reads and writes complete when a majority agree on the current value. Additional meta-data in the form of sequence numbers or time stamps are included to identify which disagreeing replica is correct when a different quorum participates in a read. The replication is often implemented as distributed state machine with an instance of the consensus protocol determining the Nth command, which may be "write key A=value B" where the current value of A is the latest of its writes, "replica 1 is no longer authoritative", or "add node 23 to the cluster". Naive implementations explicitly store sequence numbers for each command, use separate storage for undecided commands, and always store at least three copies of data. Due to these space and time overheads, consensus is often applied only to determining which replicas are authoritative. While this avoids replica authority determination as a single point of failure, the system may still be vulnerable to sequential failures.

A reallocate-on-write policy may be implemented with a scheme that implies the temporal order of writes, such as a log ordering the writes, or sequence numbers on written blocks. The reallocate-on-write policy may be used to provide low-latency IO to storages requiring a separate erase phase and/or to accommodate storages that may have bad blocks, such as flash memories. The reallocate-on-write policy implicitly retains old copies of data. The mechanism used for reallocate-on-write may imply ordering which can be used for consensus processing without requiring that additional consensus sequence numbers be stored for the consensus protocol. Time stamps or sequence numbers stored with blocks of data could be used for consensus ordering. The order of blocks in a log implemented as a linked list could be used. Offset into a block or region could be used alone or with one of these other methods. However, there is a need for techniques that allow consensus-based replication tolerant of more sequential failure modes to be implemented with the same time and space overhead as simpler master-slave replication schemes.

BRIEF DESCRIPTION OF THE DRAWINGS

Embodiments of the present embodiments are described herein by way of example, and not by way of limitation, in the figures of the accompanying drawings and in which like reference numerals refer to similar elements, as follows.

DETAILED DESCRIPTION

Approaches for using data replication in a distributed node system are disclosed. In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known components are shown in block diagram form to avoid obscuring the present disclosure.

A method in accordance with the present embodiments includes using data replication in a distributed node system including a plurality of nodes. The method includes implementing a consensus protocol for failure recovery. Data items and Information relating to consensus protocol roles of participant nodes is stored in at least some of the plurality of nodes. Logical logs stored in at least some of the plurality of nodes are created. The logical logs contain additional consensus protocol information including container metadata and replicated data.

Embodiments described herein uses "write-once" persistent storage, such as flash memory, to simplify implementation of the consensus protocol. The write-once storage maintains multiple old versions of the data items, thereby making implementation of the consensus protocol more efficient in terms of the number of write operations and the used storage space as described in more detail herein. The embodiments need not explicitly store a consensus protocol state. Instead the techniques can exploit relationships between the expected consensus protocol state in an error-free operation mode and reallocate-on-write meta-data so that consensus state does not need to be explicitly stored. Moreover, the fact that a not-yet-consistent local copy of data written this way is not visible to readers allows consensus-based replication tolerant of more sequential failure modes to be implemented with reduced time and space overheads.

Figure 1:
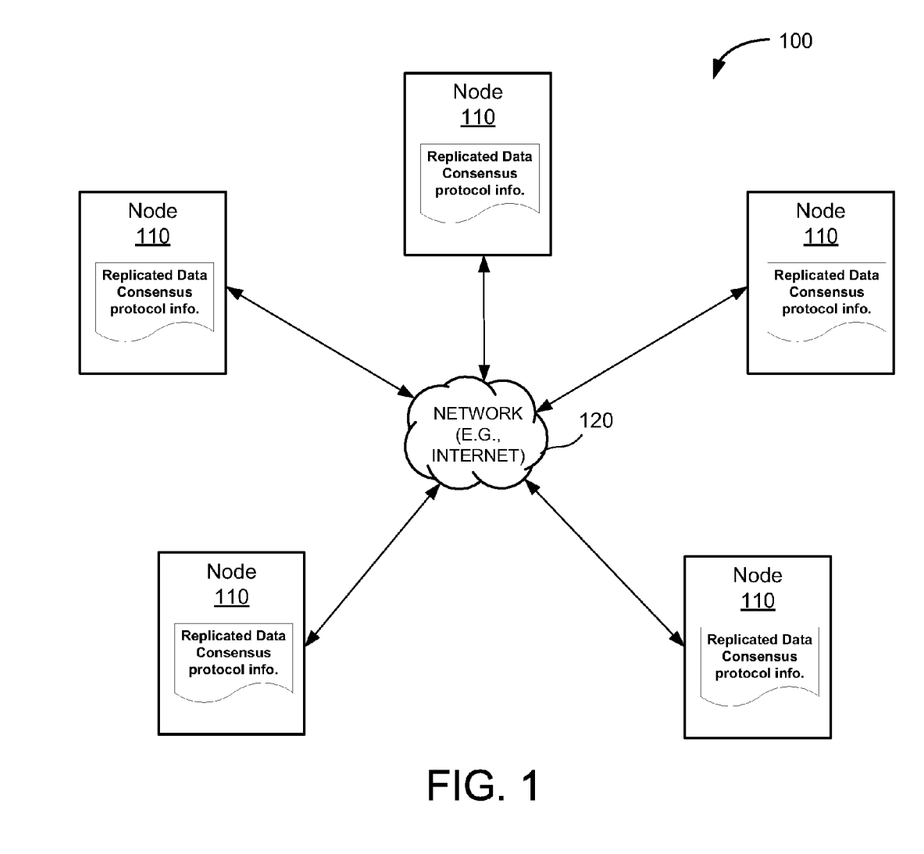
FIG. 1 is a block diagram of a distributed node system using consensus replication in accordance with some embodiments.

FIG. 1 is a block diagram of a distributed node system 100 using consensus replication in accordance with some embodiments. Distributed node system 100 includes a multitude of nodes 110 communicating with each other via the network 120. Each node 110 may be a computer system such as server, a personal computer or any other machine capable of processing, storing, and communicating data. Network 120 includes Internet, a wide area network (WAN), or a Local area network (LAN).

Figure 2:
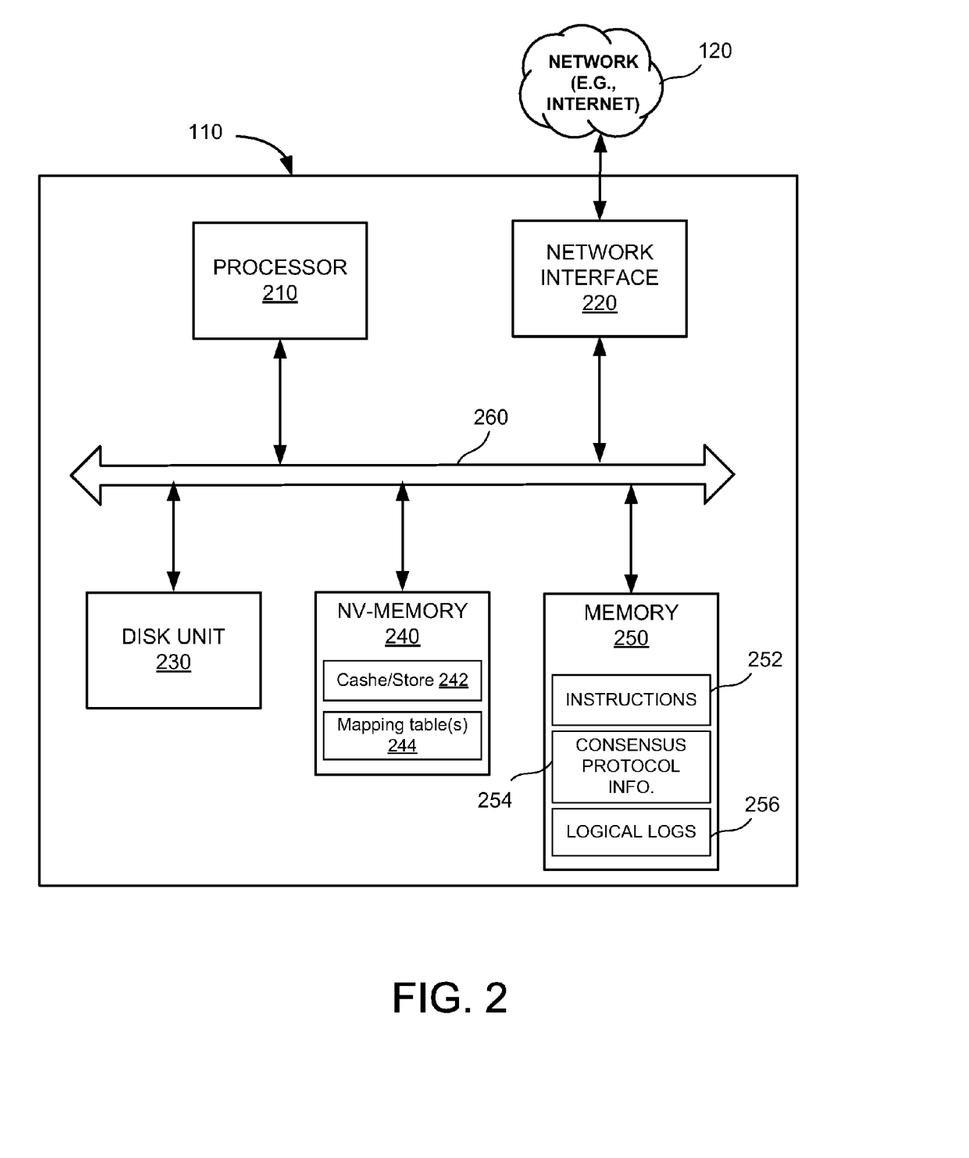
FIG. 2 is a block diagram of an embodiment of each node of FIG. 1.

Present embodiments implement a consensus protocol such as Paxos for failure recovery in data replication among nodes 110 of distributed node system 100. In implementing the protocol, each node 110 may assume one or more roles such as Proposer, Acceptor, or Learner as will be discussed in more detail below with respect to FIG. 5. Data items and information relating to consensus protocol roles of each node 110 may be stored in one or more of the nodes 110. The information relating to consensus protocol roles includes, for example, a Propose and an Accept message (e.g., ballot) communicated between various nodes 110. Also, during a conflict or a crash recovery, message numbers will be stored in one or more of nodes 110. In an embodiment, logical logs containing additional consensus protocol information including container metadata and replicated data are created and stored in some of the nodes 110. FIG. 2 is a block diagram of an embodiment of each node 110 of FIG. 1. Node 110 includes a processor 210, a network interface 220, a disk unit 230, non-volatile (NV) memory 240, and memory 250 all communicating with each other via a bus 260. Processor 210 may include one or more processors working separately or in parallel to execute programs including instructions 252 stored in memory 250. Network interface 220 provides support for connecting node 110 to network 120. Disk unit 230 may support one or more hard drive disks (HDDs), other magnetic or optical disks, or state drives (SSDs). NV-memory 240 may include read only memory (ROM) and flash memory. In present embodiment, NV-memory 240 is considered to be flash memory (i.e. write-once storage). Flash memory 240 includes cache/store 242. Flash memory 240 has the property that when a data item (such as a block in a block device) is overwritten, it does not literally put a new data item in the same place as the old data item. Instead, it writes the new data item to a new location in flash memory 240, leaving the old data item in place. The flash memory 240 uses one or more mapping tables 244 to indicate where the most current version of a piece of data item resides. In some embodiments the mapping tables may be stored in memory 250. Later on, flash memory 240 may erase the region that contains the old data when it needs to reuse the space. Erasure may be deferred because it can be a high latency operation, and may only be done on large contiguous regions of storage at a time. Flash memory controller (not shown in FIG. 2 for simplicity) must therefore do "garbage collection" to reclaim unused space within an erasure region. Any current data item within a region that is selected for erasure is copied and compacted into a different, unused region before the old region can be erased. The fact that flash memory 240 naturally maintains multiple old versions of a data item can be exploited to implement a consensus protocol that is efficient in terms of the number of writes it uses to maintain state, and in terms of the amount of space it requires to hold that state.

Memory 250 is the main memory of node 110 and may include random access memory (RAM) or dynamic RAM (DRAM). Memory 250 may include programs and instructions 252 which upon executed by processor 210 implement the methods and techniques of the present embodiments. For example, codes used to implement consensus protocol algorithms such as Paxos may be stored in memory 250. In some embodiments, such codes are stored non-volatile memory 240. Memory 250 may also store copies of consensus protocol information 254 and logical logs 256, which are stored in nonvolatile memory 240. Copies of the mapping table 242 may also be stored in memory 250. Consensus protocol information 254 includes information relating to consensus protocol roles of participant nodes. Logical logs 256 contain additional consensus protocol information including container metadata and replicated data.

Figure 3:
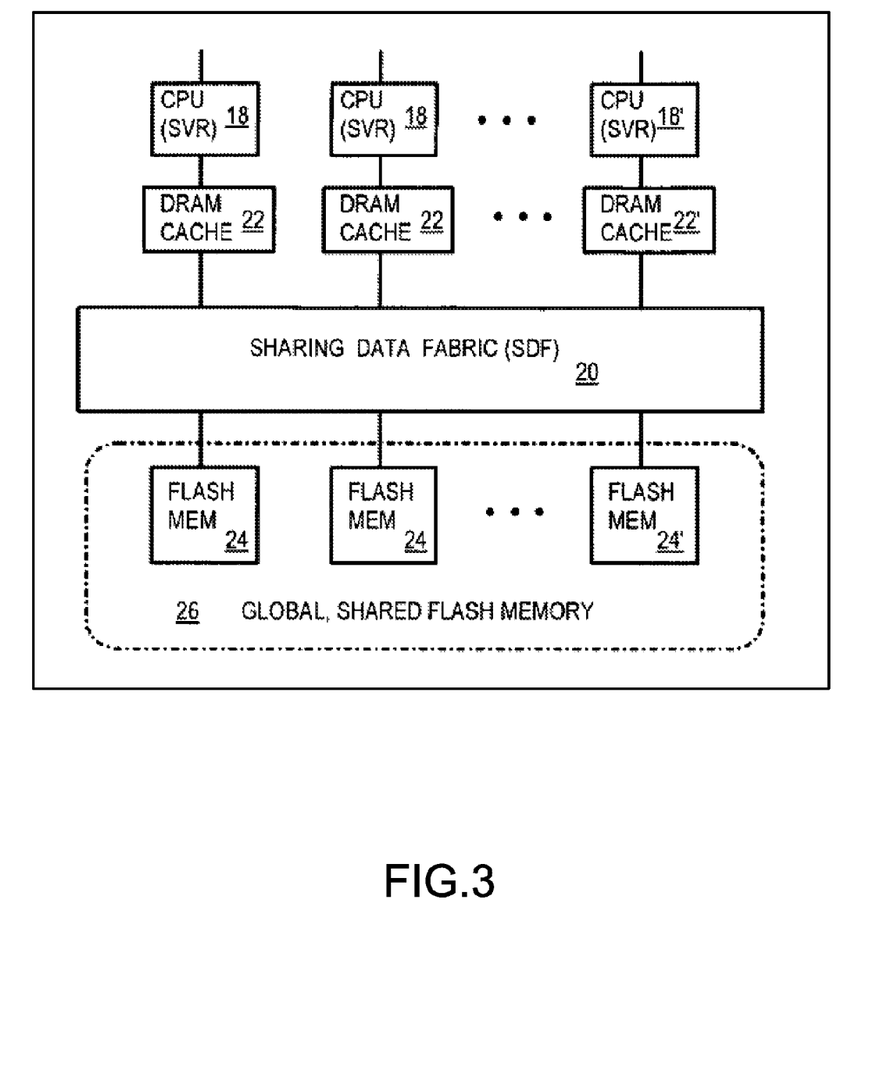
FIG. 3 is a block diagram illustrating a globally-shared flash memory accessible to multiple nodes of FIG. 1 using a Sharing Data Fabric (SDF)

In embodiments, processor 210 is configured to make multiple versions of the data items stored in flash memory 240 visible to an application (e.g., a key-value store application), such that the application can use the multiple versions to maintain a consensus protocol state. Processor 210 may implement the consensus protocol for a distributed key value store with master-slave replications. Processor 210 may also be configured to apply the consensus protocol on a per-fragment basis at each node. The consensus protocol may be applied via processor 210 to clustered rational databases, by replicating each row of the rational database as the row is written and applying the consensus protocol to each row write operation. Processor 210 may be further configured to use erasure coding for each row of the rational database as discussed in more detail herein. Processor 210 may apply the consensus protocol to cluster configurations other than a master-slave configuration, including a configuration of the plurality of nodes, in which more than one node are allowed to perform write operations. FIG. 3 is a block diagram illustrating a globally-shared flash memory accessible to multiple nodes of FIG. 1 using a Sharing Data Fabric (SDF) 20. Central Processing Units (CPUs) or processors 18-18' of nodes 110 of FIG. 1 can execute programs such as server or other applications to process requests that arrive over network 120 of FIG. 1. Each of processors 18 has a cache of DRAM 22 that contain local copies of data objects associated with the corresponding node 110. These local copies in DRAM 22 are accessed by processors 18 in response to requests from external users.

While DRAM 22, 22' stores transient copies of data objects, the data objects are more permanently stored in flash memory 24-24'. Data objects remain in flash memory 24,-24' and are copied to caches in DRAM 22-22' in response to access requests by programs running on processors 18, 18'. SDF 20 is a middleware layer that includes SDF threads running on processors 18, 18', and Application Programming Interfaces (APIs) and tables of data. A physical interconnect such as an Ethernet or InfiniBand® fabric connect physical nodes together. Object copies are transferred across the physical interconnect by SDF 20 from flash memory 24-24' to cache DRAM 22-22', and among DRAM 22-22' caches as needed to ensure coherency of object copies.

Flash memory 24-24' can be physically located on many nodes such as nodes 110 having one flash memory 24 for each processor 18, or in other arrangements. SDF 20 makes all the objects stored in flash memory 24-24' appear to be stored in a global address space, even though the global address spaced is shared among many processors 18-18'. Thus flash memory 24-24' together appear to be one globally-shared flash memory 26 via SDF 20.

Figure 4:
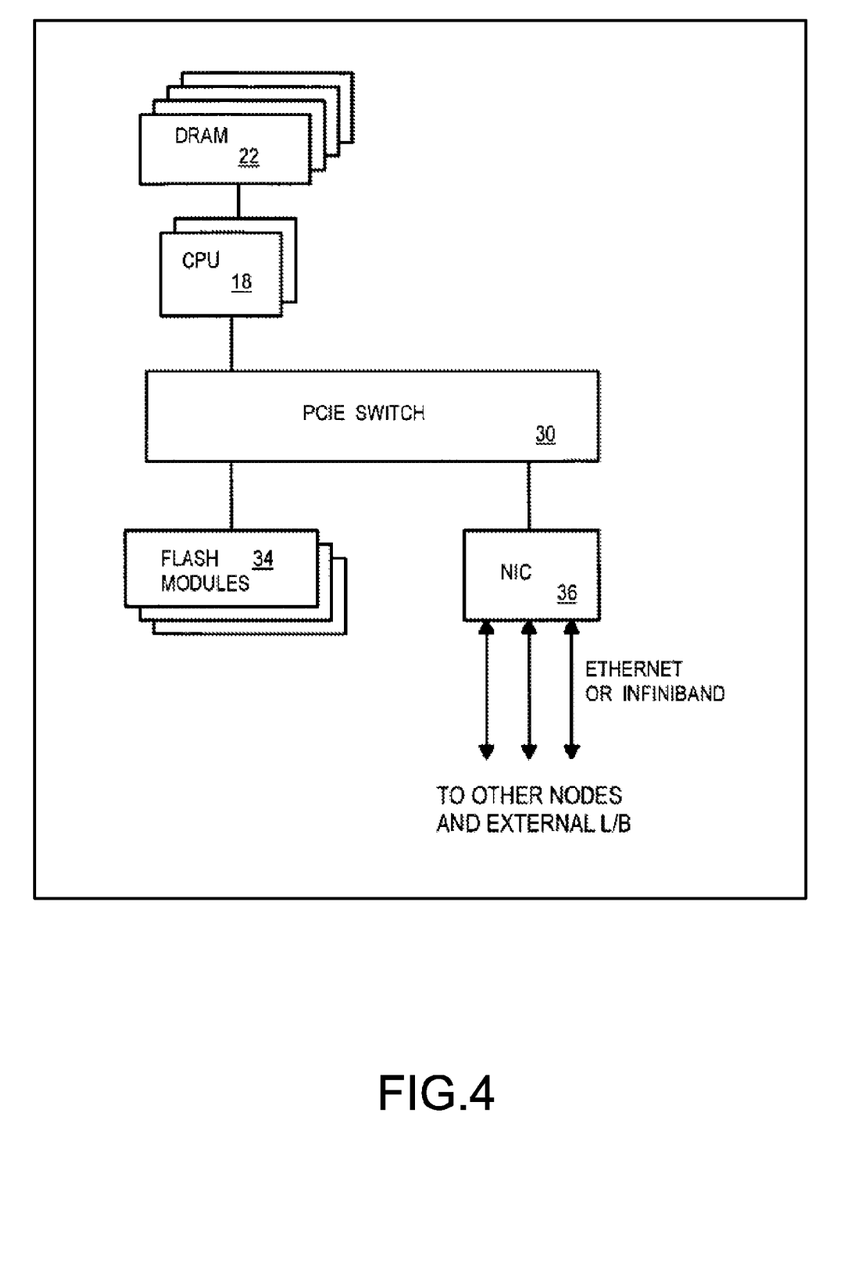
FIG. 4 is block diagram illustrating another embodiment of each node of FIG. 1 in a global shared flash memory system.

FIG. 4 is block diagram illustrating another embodiment of each node 110 of FIG. 1 in a globally-shared flash memory system. A flash memory system has multiple nodes such as shown in FIG. 4. The multiple nodes are connected together by a high-speed interconnect such as an Ethernet or InfiniBand. One or more links in this high-speed interconnect connect to Network Interface Controller (NIC) 36 on the node shown in FIG. 4.

Processor 18 executes application programs, threads, and other routines and accesses a local memory that stores program code and data, such as DRAM 22. DRAM 22 also acts as a DRAM cache of objects in the globally-shared flash memory. Processor 18 also connects to Peripheral Component Interconnect Express (PCIe) switch 30. PCIe switch 30 allows processor 18 to communicate with other nodes through NIC 36 to send and receive object copies and coherency commands. Flash modules 34 contain arrays of flash memory that store permanent objects. Flash modules 34 are accessed by processor 18 through PCIe switch 30.

FIG. 5A to FIG. 5E depicts consensus states of three nodes 110 of FIG. 1 in accordance with some embodiments. An embodiment replicating flash storage uses one of the Paxos protocols with Acceptor protocol state stored via persistent logs in flash memory such as flash memory 24 of FIG. 3.

Paxos may be split into three roles; each node such as nodes 110 of FIG. 1 may play one or more roles. First role is a Proposer that makes requests and suggests which of multiple started requests will be chosen. Progress is guaranteed when only one live Proposer is allowed to make requests, where this Proposer is the Leader. Second role is an Acceptor that persists protocol state. Third role is a Learner that learns of decisions when they receive Accepted responses from a quorum of nodes 110.

Paxos is split into two phases. The first phase (phase 1) establishes a lower bound for the system's current logical time. This is done so that proposed values are newer than all previously proposed values. Furthermore, all nodes 110 can agree on the newest value thus allowing it to be consistently chosen by subsequent executions of the protocol instance. Proposers send 1a Prepare messages to a majority of Acceptors with their current ballot number N, where ballots issued by different nodes 110 come from disjoint sets. When N is larger than any seen by an Acceptor it persists N and sends a 1b Promise message with the value seen from the Accept! command with the highest N. In the normal case without conflicts the value is null. When acknowledgements are received from a majority of replicas, Paxos proceeds to the second phase (phase 2).

The second phase decides on the newest value. In phase 2a, Proposers send Accept! commands with their current ballot number N. Where 1b Promise messages contained values, the value with the highest ballot number N must be chosen. When N is at least as high as that seen in prior Prepare and Accept! messages the value is stored and Accepted responses sent to the Learners. Otherwise the Acceptor denies and the Proposer reverts to phase 1. In an embodiment, phase 1 can be eliminated on later instances of the protocol thus saving two message delays, unless conflicts are detected in phase 2. This may be called Multi-Paxos.

Figure 5A:
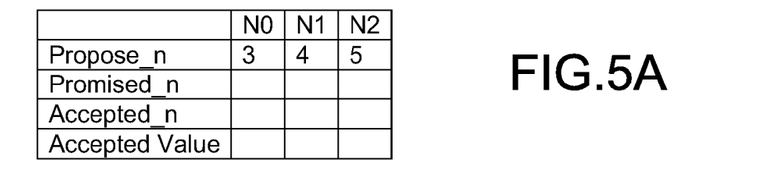
FIG. 5A to FIG. 5E depicts consensus states of three nodes in accordance with some embodiments.
Figure 5B:
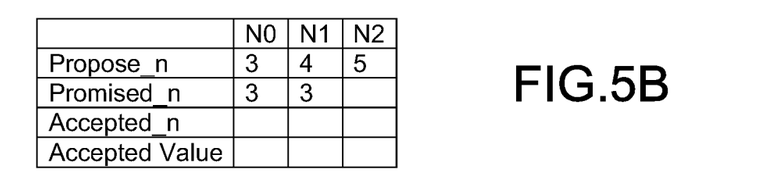
Figure 5C:
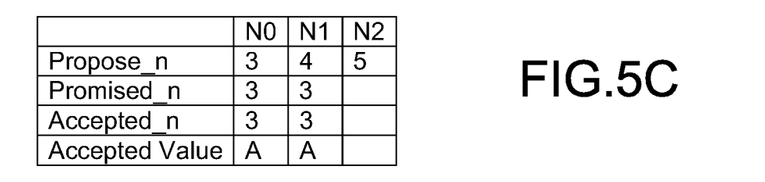
Figure 5D:
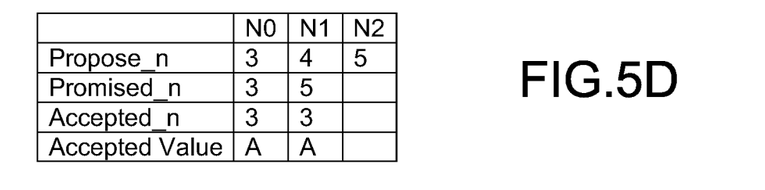
Figure 5E:
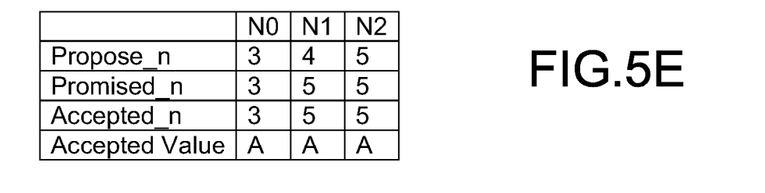

For example, consider a 3-node system with nodes N0, N1, and N2 each issuing ballots with numbers derived from 3*i+ node_number (i.e., 0, 1, and 2 for nodes N0, N1, and N2) for all positive integer values of i. For instance, for i=1, ballot numbers for nodes N0, N1, and N2 will be 3, 4, and 5, respectively, as shown in FIG. 5A as an initial state. First, node N0 sends Propose (3) to nodes N0 and N1. These nodes (N0 and N1), in response, send Promise (3, null) as represented by numbers "3" in the second row of the table under nodes N0 and N1 in the state shown in FIG. 5B. Next, node N0 chooses a value A and sends Accept! (A,3) to nodes N0 and N1. In response, nodes N0 and N1 send Accepted (A,3), which is reflected in corresponding third and fourth rows of table of FIG. 5C. Subsequent iterations of the protocol will receive a Promise from nodes N0 and N1. Node N2 then sends Propose (5) to N1 and N2 and, in response, N1 sends Promise (5, {A,3}) and N2 sends Promise (3, null) as depicted in the table shown in FIG. 5D. N2 must send Accept! (A,5) to N1 and N2 producing Accepted (A,5) sent by N1 and N2, as represented by table shown in FIG. 5E.

Paxos is a distributed write-once register implementation, where only one of multiple simultaneous writes completes and all observers see the same write completing. This becomes interesting when the register is the Nth command to a distributed state machine. The commands, for example, may include "key A=value B," "replica 1 is no longer authoritative," or "add node 23 to the cluster." Multiple nodes 110 of FIG. 1 assuming that they are the Leader may prevent progress but does not pose any correctness problems.

Acceptor protocol states including Propose and Accept! ballot numbers are only logged during conflicts and crash recovery. Replicated payload-write state-machine commands are logged to the same storage which will make up their log checkpoints. Paxos instance numbers are implied by ordering in payload logs. Limited length of window of Paxos instances, in which commands are Accepted based on other Acceptor's Accepted messages, implies that all commands preceding the window have their Accepted values stored in a local stable storage. Because present embodiments only encodes the deviation from expected steady state behavior and implies other protocol states, replication for far greater reliability than a non-replicated system is possible. This can be achieved without decreased storage performance, increased wear, or bus traffic as compared to the single copy configuration. Extremely short time to recovery is possible with Paxos execution over the small implied window of commands that may be unaccepted by a majority. Without contention, additional recovery activity is limited to log head read, a Proposer ballot number determination from Acceptor or local state, and Acceptor ballot number write. The same technique can be applied to other consensus protocols such as Implied Consensus Protocol State, as described below. The embodiment described below uses the property of flash memory to hold multiple versions of data items for a distributed key-value store with master-slave replication. Paxos type consensus is used to reconstruct authoritative state whenever a failure occurs or a new node is brought on-line.

Consider an example scenario with three nodes A, B, and C. Assume that logical times are unique regardless of which node coordinates a write operation. Nodes A, B and C use logical times 3I, 3I+1, and 3I+2, respectively, where I is a non-negative integer. The alphabetically first live node acts as coordinator with storage nodes and their clients determining this via some mechanism which provides eventual consistency when liveness is stable. Each storage node, such as node 110, provides container meta-data storage and data storage. The data storage system associates sequence numbers with each write operation. In one embodiment the sequence number is explicitly stored for the first write operation in a block and implied based on position for subsequent write operations.

Herein, Paxos type consensus is used to reconstruct authoritative state whenever a failure occurs or a new node is brought on-line. A state on a node is composed of two parts. The first part lists the key-value writes as propagated by the master node. Each entry in the list includes a key, value and global sequence number. In the second part includes meta-data that is used to compute Paxos consensus state for all key-value entries in the first part. "N=0": defines current global time, and "I 0 local=0" defines mappings that allow a node to locate the key-value entry with current data. This would be the key-value data that would be retrieved for any subsequent read operations. Also, "local (0,2) N=3" defines mappings that are used to compute the global time-stamp for each key-value entry in the first part. All of this state must be persisted for the consensus protocol to work correctly when the state of the cluster changes (nodes fail or new nodes are brought on-line). The first part holds all of the key-value data for the key-value store. A naive replication scheme would keep the same collection of key-value entries, except that it would only keep the most recent value for a particular key, and would not include global sequence numbers. The key-values would be written to persistent storage such as flash memory 240 of FIG. 2 with some mapping scheme from the mapping table 244 of FIG. 2 to locate particular keys. If a storage medium with the "write-once" property is used in the naive scheme, the storage devices would actually maintain multiple versions of overwritten data, even though the application would only have visibility to the most recent version. One aspect of the present embodiments is a way to make these multiple versions at the storage level visible to the key-value store application so that it can use the multiple versions to maintain consensus protocol state.

Continuing with the above example. Initially A acts as coordinator. A new container is created with writes going to nodes A and B with C as a standby.
Nodes A and B get meta-data
N=0
I 0 local=0
local [0,infinity) N=0
implying that the current logical time N is 0 for all protocol instances, distributed state machine command I maps to local key, value 0+I, and any proposed or estimated values stored for local key 0 onwards have logical time N=0. In one embodiment N would be the Paxos ballot number set in a Prepare phase. The absence of data implies that no command has been proposed for any state machine instance.
Node A write
I=0 Key A=value A1 locally and to node B
I=1 Key B=value B1 locally and to node B
I=2 Key A=value A2 locally and crashes before B receives the data.
In one embodiment, these write operations would be performed as Paxos Accept! Commands. B learns that A is no longer live, becomes coordinator, and issues a write request Key B=value B2.
Node B gets the logical time locally
N=0
and from C
null
and requests that it be 1 thus creating meta-data
Node B state
N=1
I 0 local=0
local [0, infinity) N=0
Node C state
N=1
Node B iterates over the first of the state machine commands
N=0 I=0 Key A=value A1
logically writing
N=1 I=0 Key A=value A1
to itself and 'C'. This may be optimized to a meta-data mapping change locally
Node B state
N=1
I 0 local=0
local [0, 1) N=1
local [1, infinity) N=0
local 0 Key A=value A1
local 1 Key B=value B1
Node C state
N=1
I 0 local=0
local [0, infinity) N=1
local 0 key A=value A1
The process repeats for state I=1 which is determined to be the limit, thus leaving the state on both B and C as
N=1
I 0 local=0
local [0, infinity) N=1
local 0 Key A=value A1
local 1 Key B=value B1
and B assigns the new write I=2, which completes, leaving
local 2 Key B=value B2
on C with the write stamped Itime N=1.
B crashes. A restarts, assumes the coordinator role, and operates on itself and 'C' yielding
Node A state
N=3
local=0
local [0, 2) N=3
local [2, infinity) N=0
I=0 Key A=value A1 implied N=3
I=1 Key B=value B1 implied N=3
I=2 Key A=value A2 implied N=0 and node C to
    N=3
    I 0 local=0
    local [0, 2) N=3
    local [2, infinity) N=1
    I=0 Key A=value A1 implied N=3
    I=1 Key B=value B1 implied N=3
    I=2 Key A=value A2 implied N=1
Node A must logically write
    I=2 Key A=value A2
to both nodes.
To do this, node A must use local key 3 as an undo record for local key 2 so the meta-data and data become
    N=3
    I 0 local=0
    I 2 local=4
    local [0, 2) N=3
    local [3, infinity) N=3
    I=0 Key A=value A1 implied N=3
    I=1 Key B=value B1 implied N=3
    Key A=value A2 not visible to the consensus protocol
    Key A=value A1 will undo Key A=value A2 on local recovery
    I=2 Key B=value B2 implied N=3
The ranges
    local [0, 2) N=3
    local [3, infinity) N=3
can be collapsed into
    local [0, infinity) N=3

As an optimization, retention of individual state machine commands is limited to a set that are potentially undecided. As an optimization, only one end point of each half-open interval needs to be stored since they are contiguous. The present embodiments may be implemented by allowing the key-value store application to interact with the low-level storage controller as follows: (1) The low-level storage controller would allow application software to indicate when particular versions of a data item (object or block) are no longer required and can be garbage collected; (2) The low-level storage controller would provide a mechanism for application software to retrieve older versions of a data item (object or block). These new mechanisms could be used to implement the consensus protocol in the above example as follows: (A) Global state machine commands (e.g., "I=0 Key A=value A1", "I=1 Key B=value B1", etc.) would be processed by simply performing the write operation to storage, persisting the global sequence number, key and value. The low-level storage controller would write the data to a new location in storage without destroying the older version(s) of the key-value pair, and would maintain metadata that would allow the older versions to be retrieved for a particular key. (B) On the second part state described above: The application would be responsible for persisting the current global time (e.g., "N=3") and the intervals (e.g., local[0,2) N=3") used to determine the global timestamps for each object entry written in Part 1. This is a small amount of state that would only be modified when the state of the cluster changed (e.g., a node fails or a new node is added).

The low-level storage controller would maintain and persist the portion of the second part meta-data that determines which version of an object is current (e.g., "I 0 local=0"). Controllers for persistent media with the "write-once" property would typically already maintain such state. Whenever the state of the cluster changes with the failure or addition of a node, the application would follow the algorithm shown by the above example to determine the authoritative values for any key the implied global timestamp of which is not current.

For example, when a node that crashed comes back online, it will retrieve new key-values from all survivor nodes (any key-value writes that occurred at global timestamps after the node crashed). These new key-values will supersede any older writes that occurred before the failed node crashed, including those that were performed on the failed node but not replicated to one or more other nodes. This can be done efficiently because the recovering failed node can identify the particular key-values that might not be current by examining the intervals it persisted in the "Part 2" application meta-data.

In an embodiment, the flash memory controller may not provide direct access to the multiple versions that it naturally crates. Instead, the application software may create and track multiple versions (part 2 of persisted consensus data) itself by keeping track of the most recent consensus data and providing mechanisms to access and/or purge older versions as the consensus protocol establishes the authoritative version. The benefit resulting from this is that the writes that are replicated (Part 1 of the persisted consensus data) can be written directly into the data storage structure, without being staged in special buffers used only for consensus processing. This would avoid multiple copies and reduces the space requirements of the application.

An embodiment may be implemented for flash-memory storage. When multiple copies of data are stored on a flash system, such globally-shared flash memory 26 of FIG. 3, either in flash memory or in caches/store 242 and/or in flash memory 240, both of FIG. 2. Consensus may be used to determine which copies have valid data and which copy or copies of the data are faulty. A consensus protocol like Paxos may be used to determine what writes went into a replica across a cluster of nodes 110 or what replicas are authoritative in part or whole. A Paxos-Flash implementation for consensus replication covers majority voting for replica copies and erasure-coded data-replica segments, with consensus applied to the actual data or meta-data for determining which replicas are valid.

The example described above was for a master-slave cluster with replication, in which writes are sent to a single master, which replicates the writes to one or more slave nodes. In this example, all nodes in the cluster maintain complete replicas of the key-value data. An alternative for brute-force replication is to spread the data across multiple nodes using erasure coding. Erasure coding may provide redundancy without the overheads from strict replication of data items. Erasure codes may divide an object into "n" fragments and recode first fragments into "m" fragments, where "n">"m". The parameter r=m/n<1 may be called the rate of encoding. A rate r code increases the storage cost by a factor of 1/r. The key property of erasure codes may be that the original object can be reconstructed from any m s fragments. For example, using an r=¼ encoding on a block divides the block into m=16 fragments and encodes the original m fragments into n=64 fragments; thereby, increasing the storage cost by a factor of four.

Erasure codes are a superset of the well-known replicated and RAID systems. For example, a system that creates four replicas for each block can be described by an (m=1, n=4) erasure code. RAID level 1, 4, 5 can be described by an (m=1, n=2), (m=4,n=5) and (m=4, n=5) erasure code, respectively.

Erasure coding is a subset of error correction which subdivides a data set (e.g., a sub-object, a single-object, or multiple objects) into shards and tolerates the erasure/loss of a subset of the shards. This method may be applied to simple replication (with copies) or erasure coding. When replicating a data container, the container is subdivided into segments where the segments are individually placed and replicated. The number of segments may be substantially larger than the number of nodes, with different segments having replicas (copies) or erasure-coded shards spread across subsets of the nodes 110 selected to tolerate certain numbers and patterns of failures. The segment replicas may be allocated across nodes using consistent hashing, chained de-clustering, dynamic load balancing, or other schemes. The two main types of replication are "operation transfer" and "state transfer". Operation transfer replication duplicates individual operations such as specific writes, e.g., "Object A byte offset 42='a'," with the replicated state being the cumulative effect of such operations. State transfer replication copies state, such as Object A offsets 0 through 511 inclusive.

One implementation of operation transfer replication applies a consensus protocol like Paxos (with or without the above optimizations) to determine the set of data and meta-data writes to each of these segments. In this case, there are not authoritative and non-authoritative container segment replicas. Instead, the correct data is determined by agreed upon state plus additional states, determined via consensus protocol execution for potentially undecided state machine commands, on at least a quorum of nodes 110. Write operations succeed when a quorum of replicas agree that a given (key, value) combination is the Nth update to the system. For classic Paxos, successful write operations to N+1 out of 2N+1 segment replicas would be required. Other variations and protocols can be used to provide different performance or fault tolerance characteristics with larger quorum sizes. For example, Castro-Liskov's protocol could be applied to tolerate Byzantine failures with a quorum size of 2N from 3N segment replicas. As an optimization, only a set of replicas on primary nodes constituting a quorum may be written during normal operation, with the others only accessed when a primary node has failed.

Erasure coding may be implemented with an additional write phase where the coordinator persists portions of a tentative value x[consensus protocol Instance][coordinator] to at least j of k shards. This value may be stored optimistically in a similar manner to replicated writes. Then a subset or superset of the nodes run a consensus protocol such as Paxos to agree on the written value, with the set of nodes chosen to satisfy reliability and availability requirements.

An (m,n) erasure code would encode a data item into n fragments that would be sent to n separate nodes in a cluster. If one or more nodes fail, the data item could still be recovered if at least m nodes remain. Erasure codes are attractive because they can provide similar or better fault tolerance than brute-force replication with less storage overhead. Present embodiments could be applied to erasure coded data by simply applying the consensus algorithm on a per-fragment basis at each node. Key-value stores/caches have been used as examples. Present embodiments could also be used in more complex data storage systems, including relational databases. A straightforward way in which the present embodiments could be used in a clustered relational database would be to replicate database rows as they are written and apply consensus to each row write. Alternatively, erasure coding could be used for each row write. Other similar applications would be apparent to someone skilled in the art. This method can also be applied to cluster configurations other than master slave. For example, it can also be applied in a cluster in which more than one node is allowed to perform writes.

Consider a five-node system consisting of nodes A through E that tolerates the loss of any two nodes through a 2 of 4 erasure code and Paxos execution across 5 nodes. One container segment may have erasure coded data on nodes A+B+C+D with Paxos executed on nodes C+D+E during normal operation and nodes A or B when one of the primary Paxos nodes has failed. A five node system which survives the loss of one node may combine a 4 of 5 erasure code with Paxos execution on 2 nodes during normal operation and a third during failures. Other implementations are possible.

One variation on this scheme would be to have a proxy which agrees with the logically newest value from a subset of nodes 110. Given nodes A, B, and C with fast links between B and C and a slow link to A, A could act as a proxy where usually it agrees with the newest value from B or C but changes to only agreeing with the node from B when C fails.

While the simplest implementation requires executing the consensus protocol for read operations, this can be avoided by granting a lease to the node acting as the consensus protocol Leader or coordinator that guarantees write operations will not be completed for any other node. The lease can be implicitly extended each time the coordinator has a state machine command accepted by a quorum of nodes, where the command may be a null-operation during idle periods. The lease implies that the holder has seen all write operations and can therefore directly serve authoritative data to readers without executing the consensus protocol thus significantly reducing read operation cost.

Another embodiment only applies the consensus protocol to selected meta-data, including replicas or shards (for erasure-coded replica fragments) which are authoritative with a different mechanism used for the actual replication. In this embodiment, consensus protocol processing is not applied to the data write and read operations, thus, reducing overhead. Storage used and recovery time may be decreased by reverting to state transfer plus a set of additional operations in some situations. For example, write operations which have been superseded by newer data may be garbage collected once all replicas have processed them, thus leaving a baseline state plus newer deltas. Following a long outage, a new replica may be initialized with state transfer from this baseline and stale replica replaced. While Classic Paxos voting is described, other embodiments may use different variants or other voting schemes, such as a simple majority vote, a vote over a threshold amount (such as >66%), or some other method to ensure data integrity when data is replicated, especially onto different kinds of memory, such as DRAM or SRAM caches and flash memory. Weaker consistency may be exchanged for greater availability by allowing replicas to diverge and eventually be reconciled, via mechanisms including but not limited to newest-write-wins or causal versioning with automatic conflict resolution where possible and a fallback to client application resolution.

Data redundancy may be provided by mirroring content. Some or all of the contents of a memory sub-system at a particular one of nodes 110 is mirrored to one or more other nodes 110. Some or all of the contents of cache of the particular node, such as cache 242 (see FIG. 2) of flash memory 240 (see FIG. 2) of the particular node, are mirrored in caches 242 of one or more other nodes 110. In some embodiments and/or usage scenarios, mirroring of cache 242 provides copies in more than one of nodes 110 of any data whose most recent version is not yet stored in flash memory 240. In a second example, some or all of the contents of flash memory 240 of the particular node, are mirrored in the respective flash memories 240 of the one or more other nodes 110.

Figure 6:
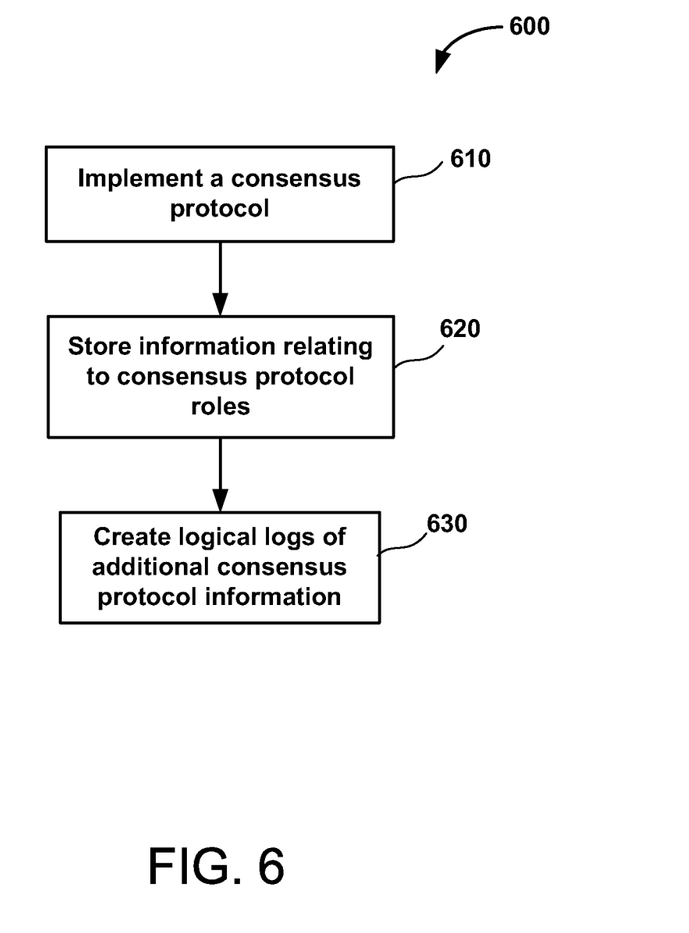
FIG. 6 is a flow diagram of a method for data replication in a distributed node system in accordance with some embodiments.

FIG. 6 is a flow diagram of a method 600 for data replication in a distributed node system in accordance with some embodiments. Method 600 includes implementing a consensus protocol such as Paxos for failure recovery in replication of data in distributed node system 100 of FIG. 1 (610). Information relating to consensus protocol roles of participant nodes 110 of FIG. 1, such as consensus protocol information 254 of FIG. 2, is stored in one or more of nodes 110 (620). Logical logs 256 of FIG. 2 are created and stored in some of nodes 110. The logical logs 256 contain additional consensus protocol information including container metadata and replicated data (630).

One or more embodiments described herein provide that methods, techniques, and actions performed by a computing device are performed programmatically, or as a computer-implemented method. Programmatically means through the use of code or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium, such as disk unit 230 of FIG. 2. Numerous machines, such as node 110 of FIG. 2, may provide examples of processing resources and computer-readable mediums, on which instructions for implementing present embodiments can be carried and/or executed. In particular, the numerous machines include processor(s) and various forms of memory for holding data and instructions. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs or a computer usable carrier medium capable of carrying such a program.

While the present embodiments have been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A method for data replication and failure recovery in a distributed node system including a plurality of nodes, wherein each of the plurality of nodes is configurable for participating in performance of the method, the method comprising:
processing requests using a consensus protocol, including:
  storing, in at least some of the plurality of nodes:
    data items;
    consensus protocol information relating to consensus protocol roles of participant nodes; and
    logical logs, the logical logs containing additional consensus protocol information including container metadata and replicated data items, wherein the container metadata includes mapping tables to identify one or more nodes in the plurality of nodes containing a most recent replicated data item; and
after failure of a node in the plurality of nodes, using the stored consensus protocol information and the stored additional consensus protocol information to reconstruct an authoritative state of the failed node in the plurality of nodes.

2. The method of claim 1, wherein the consensus protocol roles include a Proposer and an Acceptor role, and wherein the consensus protocol information relating to consensus protocol roles of participant nodes includes a propose and an accept message.

3. The method of claim 1, wherein the consensus protocol includes a Paxos protocol and each node of the plurality of nodes includes flash memory.

4. The method of claim 1, further comprising storing message numbers during a conflict or a crash recovery in at least some of the plurality of nodes.

5. The method of claim 1, further comprising:
creating logical logs of replicated data of write commands from a consensus protocol state machine in at least some of the plurality of nodes; and
using the logical logs of replicated data as their reference points, wherein consensus protocol instance numbers are implied by ordering in the logical logs of replicated data.

6. The method of claim 1, further comprising using the consensus protocol to distinguish valid data from faulty data, when multiple copies of data are stored in the distributed node system.

7. The method of claim 1, further comprising using the consensus protocol to determine: A) identity of a write command executed across the distributed node system; B) statuses of stored replicas including an authoritative or partially authoritative statuses; and C) validity of the stored replicas.

8. The method of claim 1, further comprising replicating a data container by subdividing the data container into segments and replicating the segments by storing replicas or erasure-coded shards of the segments in a selected set of the plurality of nodes, the selected set being tolerant to certain numbers and patterns of failures.

9. The method of claim 8, further comprising allocating the segment replicas across the selected set using schemes including hashing, chained de-clustering, and dynamic load balancing.

10. The method of claim 8, wherein replicating includes operation transfer and state transfer replications.

11. The method of claim 10, wherein the operation transfer includes duplicating individual operations with a replicated state including a cumulative effect of the individual operations, and wherein state transfer includes copying states.

12. The method of claim 10, further comprising applying the consensus protocol to determine a set of data writes to each of the segments.

13. The method of claim 10, further comprising applying the consensus protocol to selected meta data including determining the authoritative status of a replica and using a different protocol for actual replication of the segments.

14. The method of claim 13, wherein mirroring comprises at least one of:
mirroring based on physical addresses; or mirroring based on node addresses.

15. The method of claim 1, further comprising providing redundancy by mirroring at least some of the data stored in a node to one or more nodes of the plurality of nodes, wherein mirroring is performed by using hardware or software in at least one of the nodes.

16. The method of claim 1, wherein the storage device includes a write-once storage device, including flash memory, for maintaining multiple versions of a data item.

17. The method of claim 16, wherein the storage device uses mapping tables to identify a location in the storage device of a most recent replicated data item of the multiple versions.

18. The method of claim 16, further comprising making the multiple versions of the data item visible to an application, such that the application can use the multiple versions to maintain a consensus protocol state.

19. The method of claim 18, wherein the application is a key-value store application and the method further comprises implementing the consensus protocol for a distributed key value store with master-slave replications.

20. The method of claim 1, further comprising applying the consensus protocol on a per-fragment basis at each node.

21. The method of claim 1, further comprising applying the consensus protocol to clustered relational databases, including replicating each row of the clustered relational databases as the row is written and applying the consensus protocol to each row write operation.

22. The method of claim 21, further comprising using erasure coding for each row of the clustered relational databases.

23. The method of claim 1, further comprising applying the consensus protocol to cluster configurations, other than a master-slave configuration, including the plurality of nodes in which more than one node are allowed to perform write operations.

24. A system for data replication and failure recovery in a distributed node system, the distributed node system comprising:
a plurality of nodes;
each node including:
one or more processors; and
memory having instructions for execution by the one or more processors, the instructions for:
processing requests using a consensus protocol, including:
storing, in at least some of the plurality of nodes:
data items;
consensus protocol information relating to consensus protocol roles of participant; and
logical logs, the logical logs containing additional consensus protocol information including container metadata and replicated data items, wherein the container metadata includes mapping tables to identify one or more nodes in the plurality of nodes containing a most recent replicated data item; and
after failure of a node in the plurality of nodes, using the stored consensus protocol information and the stored additional consensus protocol information to reconstruct an authoritative state of the failed node in the plurality of nodes.

25. The system of claim 24, wherein the consensus protocol includes a Paxos protocol, the consensus protocol roles include a Proposer and an Acceptor role, the consensus protocol information relating to consensus protocol roles of participant nodes includes a propose and an accept message, and each node of the plurality of nodes includes flash memory.

26. The system of claim 24, wherein implementing the consensus protocol for failure recovery further comprises storing message numbers during a conflict or a crash recovery in at least some of the plurality of nodes.

27. The system of claim 24, wherein implementing the consensus protocol for failure recovery further comprises:
creating logical logs of replicated data of write commands from a consensus protocol state machine in at least some of the plurality of nodes; and
using the logical logs of replicated data as their reference points, wherein consensus protocol instance numbers are implied by ordering in the logical logs of replicated data.

28. The system of claim 24, wherein implementing the consensus protocol for failure recovery further comprises:
using the consensus protocol to determine:
A) identity of a write command executed across the distributed node system and the;
B) statuses of stored replicas including an authoritative or partially authoritative statuses; and
C) validity of the stored replicas.

29. The system of claim 24, wherein the memory includes a write-once storage device, including flash memory, configured to maintain multiple versions of a data item.

30. The system of claim 29, wherein the write-once storage device is configured to use mapping tables to identify a location in the storage device of a most recent replicated data item of the multiple versions.

31. The system of claim 30, wherein the processor is configured to make the multiple versions of the data item visible to an application, such that the application can use the multiple versions to maintain a consensus protocol state.

32. The system of claim 24, wherein the processor is further configured to apply the consensus protocol on a per-fragment basis at each node.

33. The system of claim 24, wherein the processor is further configured to apply the consensus protocol to clustered relational databases, by replicating each row of the clustered relational databases as the row is written and applying the consensus protocol to each row write operation.

34. The system of claim 33, wherein the processor is further configured to use erasure coding for each row of the clustered relational databases.

35. The system of claim 33, wherein the processor is further configured to apply the consensus protocol to cluster configurations, other than a master-slave configuration, including the plurality of nodes in which more than one node are allowed to perform write operations.

* * * * *

UNITED STATES PATENT AND TRADEMARK OFFICE
CERTIFICATE OF CORRECTION

| | | |
|---|---|---|
| PATENT NO. | : 8,856,593 B2 | Page 1 of 1 |
| APPLICATION NO. | : 13/085441 | |
| DATED | : October 7, 2014 | |
| INVENTOR(S) | : Eckhardt et al. | |

It is certified that error appears in the above-identified patent and that said Letters Patent is hereby corrected as shown below:

In the Claims,

Claim 24, col. 15, line 40, please delete "participant; and" and insert --participant nodes; and--

Signed and Sealed this
Twenty-seventh Day of January, 2015

Michelle K. Lee
*Deputy Director of the United States Patent and Trademark Office*